United States Patent
Liu et al.

(10) Patent No.: US 12,418,515 B2
(45) Date of Patent: Sep. 16, 2025

(54) FILE ENCRYPTION AND TRANSMISSION METHOD AND APPARATUS

(71) Applicant: INSPUR SUZHOU INTELLIGENT TECHNOLOGY CO., LTD., Jiangsu (CN)

(72) Inventors: Yang Liu, Jiangsu (CN); Zheng Qin, Jiangsu (CN); Tengda Yang, Jiangsu (CN); Jinbiao He, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 51 days.

(21) Appl. No.: 18/250,210

(22) PCT Filed: Jul. 29, 2021

(86) PCT No.: PCT/CN2021/109219
§ 371 (c)(1),
(2) Date: Apr. 23, 2023

(87) PCT Pub. No.: WO2022/083206
PCT Pub. Date: Apr. 28, 2022

(65) Prior Publication Data
US 2023/0396594 A1    Dec. 7, 2023

(30) Foreign Application Priority Data
Oct. 23, 2020 (CN) .......................... 202011148386.2

(51) Int. Cl.
*H04L 9/40* (2022.01)
*G06F 21/64* (2013.01)
(Continued)

(52) U.S. Cl.
CPC .......... *H04L 63/0428* (2013.01); *G06F 21/64* (2013.01); *H04L 9/0618* (2013.01); *H04L 9/3239* (2013.01)

(58) Field of Classification Search
CPC ..... G06F 21/64; H04L 9/0618; H04L 9/3239; H04L 63/0428
(Continued)

(56) References Cited

U.S. PATENT DOCUMENTS 9,483,477 B2 * 11/2016 Francis ................. G06F 16/116
9,830,233 B2 * 11/2017 Binford ............... G06F 11/1451
(Continued)

FOREIGN PATENT DOCUMENTS

| CN | 104732159 A | 6/2015 |
|---|---|---|
| CN | 106254336 A | 12/2016 |

(Continued)

OTHER PUBLICATIONS

Search report for international Application No. PCT/CN2021/109219 mailed on Oct. 29, 2021.
(Continued)

*Primary Examiner* — Amare F Tabor
(74) *Attorney, Agent, or Firm* — Dennemeyer & Associates LLC

(57) ABSTRACT

A file encryption and transmission method and apparatus are provided. The method includes: acquiring a set of files to be transmitted; generating, for file information of each file in the set of files to be transmitted, a key string by using a first preset algorithm; compressing and encrypting, by using the key string, the set of files to be transmitted to obtain an encrypted file; encrypting the key string by using a prefabricated encryption machine to generate an encrypted string; transmitting, through a network, the encrypted file, the encrypted string and an information file to a destination end;
(Continued)

and executing, by the destination end, a decryption operation based on the encrypted string and the encrypted file to acquire a decrypted file, and performing integrity check on the decrypted file based on the file information.

18 Claims, 1 Drawing Sheet

(51) Int. Cl.
*H04L 9/06* (2006.01)
*H04L 9/32* (2006.01)

(58) Field of Classification Search
USPC .......................................................... 713/165
See application file for complete search history.

(56) References Cited

U.S. PATENT DOCUMENTS

| | | | | |
|---|---|---|---|---|
| 11,100,225 | B2* | 8/2021 | Devane | G06F 21/564 |
| 11,461,487 | B2* | 10/2022 | Peterson | H04L 9/088 |
| 12,248,607 | B2* | 3/2025 | Turney | G06F 21/6245 |
| 2017/0364450 | A1* | 12/2017 | Struttmann | H04L 9/3297 |
| 2019/0073486 | A1 | 3/2019 | Peterson | |

FOREIGN PATENT DOCUMENTS

| | | |
|---|---|---|
| CN | 109547215 A | 3/2019 |
| CN | 110099064 A | 8/2019 |
| CN | 110191136 A | 8/2019 |
| CN | 111709038 A | 9/2020 |
| CN | 112311865 A | 2/2021 |

OTHER PUBLICATIONS

Search report for Chinese application 202011148386.2, filed Oct. 23, 2020.

* cited by examiner

FILE ENCRYPTION AND TRANSMISSION METHOD AND APPARATUS

CROSS-REFERENCE TO RELATED APPLICATIONS

This is a 35 U.S.C. 371 National Stage Patent Application of International Application No. PCT/CN2021/109219, filed Jul. 29, 2021, which claims priority to Chinese application 202011148386.2, filed Oct. 23, 2020, each of which is hereby incorporated by reference in its entirety.

TECHNICAL FIELD

The disclosure relates to the technical field of network data transmission, and in particular, to a file encryption and transmission method and apparatus.

BACKGROUND

At present, network environment is more and more complex, and theft and leakage events occur frequently, so the security of file transmission through a network is more and more important. A file encryption technology improves the security of transmitting files through a network. However, if a file is directly encrypted by using an encryption machine, there will be certain requirements on the performance of the encryption machine, which will increase hardware cost.

SUMMARY

The embodiments of the present disclosure provide a file encryption and transmission method, in which a random key string is generated for each file by using a domestic encryption algorithm (Office of State Commercial Cryptography Administration (OSCCA) approved Cryptographic Algorithm), the key string is encrypted and decrypted through an encryption machine, and the file is compressed and encrypted, and decrypted and decompressed by using a big data technology, which may greatly improve the controllability of an autonomous encryption algorithm, the utilization efficiency of resources of the encryption machine, the security of transmitting files through a network, and the efficiency of file transmission, make full use of hardware resources, and reduce time costs.

Embodiments of the present disclosure provide a file encryption and transmission method, which includes the following operations.

A set of files to be transmitted are acquired.

A key string is generated, for file information of each file in the set of files to be transmitted, by using a first preset algorithm.

Each file in the set of files to be transmitted is compressed and encrypted by using the key string to obtain an encrypted file.

The key string is encrypted by using a prefabricated encryption machine to generate an encrypted string.

The encrypted file, the encrypted string and an information file are transmitted to a destination end through a network. The destination end executes a decryption operation based on the encrypted string and the encrypted file to acquire a decrypted file, and performs integrity check on the decrypted file based on the file information.

In some exemplary implementations, the file information includes one or a combination of: a file path, a file size, a last modification time, and a file Message-Digest Algorithm 5 (MD5) check value.

In some exemplary implementations, the operation that the set of files to be transmitted is compressed and encrypted by using the key string to obtain the encrypted file includes the following operations.

Each file in the set of files to be transmitted is compressed, and a compressed temporary file tmpFile.zip is output.

The compressed temporary file is encrypted by using the key string and by using a Spark technology to generate the encrypted file encryptFile.zip.

The compressed temporary file tmpFile.zip is deleted.

In some exemplary implementations, the operation that the encrypted file, the encrypted string, and the file information are transmitted to the destination end through the network includes the following operations.

A file path, a file size, a last modification time, an MD5 check value, and the encrypted string are written, in a JavaScript Object Notation (JSON) format, into the information file fileName.xml corresponding to the encrypted file.

The encrypted file is transmitted to the destination end first.

Then, the information file fileName.xml is transmitted to the destination end.

In some exemplary implementations, the operation that the destination end executes the decryption operation based on the encrypted string and the encrypted file to acquire the decrypted file, and performs the integrity check on the decrypted file based on the file information includes the following operations.

The encrypted string is decrypted at the destination end by using the encryption machine to obtain the key string.

The corresponding encrypted file is decrypted and decompressed by using the key string and by using a Spark technology.

The integrity check is performed on the decrypted file based on the file information in the information file.

The operation that the encrypted string is decrypted at the destination end by using the encryption machine to obtain the key string includes the following operations.

The information file fileName.xml is read to acquire the encrypted string.

The encrypted string is decrypted by using the encryption machine to restore the key string.

The operation that the corresponding encrypted file is decrypted and decompressed by using the key string and by using the Spark technology includes the following operations.

The encrypted file is decrypted by using an SM4 domestic encryption algorithm to obtain a decrypted temporary file tmpFile.zip.

The decrypted temporary file tmpFile.zip is decompressed by using the Spark technology to restore the decrypted file targetSourceFile.

The decrypted temporary file tmpFile.zip is deleted.

The operation that the integrity check is performed on the decrypted file based on the file information in the information file includes the following operations.

The information file fileName.xml is read to acquire a file size, a last modification time, and an MD5 check value.

A file size and an MD5 check value of the decrypted file targetSourceFile at the destination end are acquired.

The integrity check is performed based on the file size and the MD5 check value in the information file and the file size and the MD5 check value of the decrypted file.

The embodiments of the present disclosure also provide a file encryption and transmission apparatus, including a file acquisition module, a key generation module, a compression and encryption module, a key encryption module, a file transmission module, and a file check module.

The file acquisition module is configured to acquire a set of files to be transmitted.

The key generation module is configured to generate, for file information of each file in the set of files to be transmitted, a key string by using a first preset algorithm.

The compression and encryption module is configured to compress and encrypt the set of files to be transmitted by using the key string to obtain an encrypted file.

The key encryption module is configured to encrypt the key string by using a prefabricated encryption machine to generate an encrypted string.

The file transmission module is configured to transmit the encrypted file, the encrypted string and an information file to the destination end through the network.

The file check module is configured for the destination end to execute the decryption operation based on the encrypted string and the encrypted file to acquire the decrypted file, and to perform integrity check on the decrypted file based on the file information.

In some exemplary implementations, the file information includes one or a combination of: a file path, a file size, a last modification time, and a file MD5 check value.

In some exemplary implementations, the compression and encryption module is configured to perform the following operations.

Each file in the set of files to be transmitted is compressed, and a compressed temporary file tmpFile.zip is output.

The compressed temporary file is encrypted by using the key string and by using a Spark technology to generate the encrypted file encryptFile.zip.

The compressed temporary file tmpFile.zip is deleted.

In some exemplary implementations, the file transmission module is configured to perform the following operations.

A file path, a file size, a last modification time, an MD5 check value, and the encrypted string are written, in a JSON format, into the information file fileName.xml corresponding to the encrypted file.

The encrypted file is transmitted to the destination end first.

Then, the information file fileName.xml is transmitted to the destination end.

In some exemplary implementations, the file check module is configured to perform the following operations.

The encrypted string is decrypted at the destination end by using the encryption machine to obtain the key string.

The corresponding encrypted file is decrypted and decompressed by using the key string and by using a Spark technology.

The integrity check is performed on the decrypted file based on the file information in the information file.

The operation that the encrypted string is decrypted at the destination end by using the encryption machine to obtain the key string includes the following operations.

The information file fileName.xml is read to acquire the encrypted string.

The encrypted string is decrypted by using the encryption machine to restore the key string.

The operation that the corresponding encrypted file is decrypted and decompressed by using the key string and by using the Spark technology includes the following operations.

The encrypted file is decrypted by using an SM4 domestic encryption algorithm to obtain a decrypted temporary file tmpFile.zip.

The decrypted temporary file tmpFile.zip is decompressed by using the Spark technology to restore the decrypted file targetSourceFile.

The decrypted temporary file tmpFile.zip is deleted.

The operation that the integrity check is performed on the decrypted file based on the file information in the information file includes the following operations.

The information file fileName.xml is read to acquire a file size, a last modification time, and an MD5 check value.

A file size and an MD5 check value of the decrypted file targetSourceFile at the destination end are acquired.

The integrity check is performed based on the file size and the MD5 check value in the information file and the file size and the MD5 check value of the decrypted file.

The file encryption and transmission method provided by the embodiments of the present disclosure has the following beneficial effects.

First, a random key string is generated for each file by using a domestic encryption algorithm, the key string is encrypted and decrypted through an encryption machine, and the file is compressed and encrypted, and decrypted and decompressed by using a big data technology, which may greatly improve the controllability of an autonomous encryption algorithm, the utilization efficiency of resources of the encryption machine, the security of transmitting files through a network, and the efficiency of file transmission, make full use of hardware resources, and reduce time costs.

Second, even if the encrypted file is hijacked and acquired by hackers during network transmission, the file cannot be cracked due to the lack of encrypted string information. Even if the encrypted file and the encrypted string may be acquired by the hackers, the hackers need to restore the encrypted string into an original key string through the encryption machine because the file is encrypted by using the original key string. However, the encryption machine, as physical resources, is difficult to steal, so this encryption machine-based file compression encryption method has strong security.

Third, the method is generally applicable to a case of transmitting files through a network, is particularly applicable to a large file and an environment in which a big data cluster has been deployed, may be independently applied to a scene in which the files are transmitted through the network, and may also be applicable to a scene in a system that requires high security for file transmission, which guarantees the security of file information.

Other features and advantages of the present disclosure will be described in subsequent specification, and in addition, part of features and advantages may be become apparent from the specification, or be understood by implementing the present disclosure. The objectives and other advantages of the present disclosure may be implemented and achieved by structures particularly specified in the specification, the claims, and the drawings.

The technical solutions of the present application will further be described in detail below in combination with the drawings and the embodiments.

BRIEF DESCRIPTION OF THE DRAWINGS

The drawings are used to provide further understanding of the present disclosure, constitute a part of the description, and are used for explaining the present disclosure together with the embodiments of the present disclosure, but do not constitute a limitation to the present disclosure. In the drawings.

DETAILED DESCRIPTION

Exemplary embodiments of the present disclosure are described below with reference to the drawings. It is to be understood that the exemplary embodiments described herein are only used for describing and explaining the present disclosure, and are not used for limiting the present disclosure.

Figure 1:
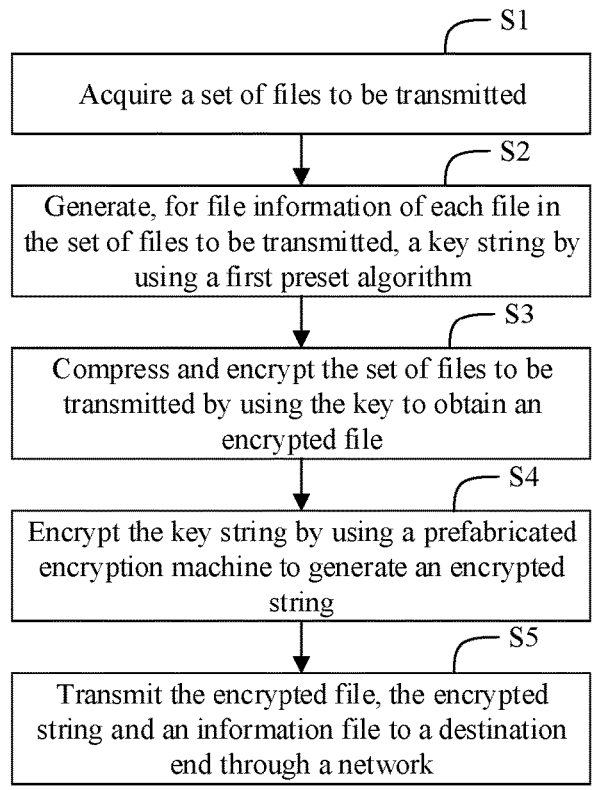
FIG. 1 is a schematic diagram of a file encryption and transmission method in the embodiments of the present disclosure.

The embodiments of the present disclosure provide a file encryption and transmission method, as shown in FIG. 1, including the following operations.

At S1, a set of files to be transmitted is acquired.

At S2, a key string is generated, for file information of each file in the set of files to be transmitted, by using a first preset algorithm.

At S3, the set of files to be transmitted is compressed and encrypted by using the key string to obtain an encrypted file.

At S4, the key string is encrypted by using a prefabricated encryption machine to generate an encrypted string.

At S5, the encrypted file, the encrypted string and an information file are transmitted to a destination end through a network. The destination end executes a decryption operation based on the encrypted string and the encrypted file to acquire a decrypted file, and performs integrity check on the decrypted file based on the file information.

The above technical solution has the following operation principle and beneficial effects.

The file encryption and transmission method of the embodiments of the present disclosure is mainly applied to file transmission between a data source end and a destination end, and mainly includes the following operations: a set of files to be transmitted is acquired; a key string is generated; a file is compressed and encrypted by using the key string and by using a big data technology (for each file, a 128-bit key string is randomly generated by using an SM4 domestic encryption algorithm); the key string is encrypted by using an encryption machine to generate an encrypted string; the file, file information, and the encrypted string are transmitted to the destination end through a network; the encrypted string is decrypted at the destination end to restore the key string; the file is decrypted and decompressed by using the key string and by using the big data technology; and file check is performed based on check information. The file is compressed and encrypted by using the key string and by using the big data technology, which may make full use of cluster hardware resources, and greatly improve the compression and encryption efficiency and the transmission efficiency. The compressed and encrypted file improves the security of network transmission, and greatly reduces the size of the file after being compressed. The network transmission rate may be improved. Furthermore, a method that only encrypts a key string by using the encryption machine to generate an encrypted string may greatly improve the utilization efficiency of the encryption machine while making full use of the encryption function of the encryption machine. In order to ensure the integrity of the file, after the file is transmitted to the destination end and is decrypted and decompressed, integrity check needs to be performed on the file to ensure an information transmission function of the file. Furthermore, for the file information of each file in the set of files to be transmitted, the key string is generated by using a first preset algorithm. For example, the file information (e.g., a type, a type proportion, a file size, and the like) of all files in the set of files is traversed, and a preset correspondence table is inquired to determine a first key string, so that the file information of the set of files may be directly inferred at the destination end according to the first key string, and an information file does not need to be generated and transmitted, which further improves the security of file transmission.

In some embodiments, the file information includes one or a combination of: a file path, a file size, a last modification time, and an MD5 check value. MD5 is a message digest algorithm, and is a widely used cryptographic hash function that may generate a 128-bit hash value to ensure complete and consistent information transmission.

In order to realize the compression and encryption of the file, in some embodiments, the operation that the set of files to be transmitted is compressed and encrypted by using the key string to obtain the encrypted file includes the following operations.

Each file in the set of files to be transmitted is compressed, and a compressed temporary file tmpFile.zip is output.

The compressed temporary file is encrypted by using the key string and by using a Spark technology to generate the encrypted file encryptFile.zip.

The compressed temporary file tmpFile.zip is deleted.

The above technical solution has the following operation principle and beneficial effects.

At a data source end, the set of files to be transmitted needs to be encrypted first. Compressing before encrypting is used in the embodiments of the present disclosure, and specific operations for compressing and encrypting the files to be transmitted by using the key string to obtain the encrypted file are as follows: compressing the set of files to be transmitted, and outputting the compressed temporary file tmpFile.zip; encrypting the compressed temporary file by using the key string and by using the Spark technology to generate the encrypted file encryptFile.zip; and finally, deleting the compressed temporary file tmpFile.zip in order to release memory space used for compressing and encrypting. Different compressed files are generated in different compression modes, and may only be restored into original files by corresponding compression programs, so the security of the files may be further improved by the solution of first compressing the file and then encrypting the file using the key string. Spark is a fast and universal computing engine designed specifically for large-scale data processing.

In some embodiments, the operation that the encrypted file, the encrypted string, and the file information are transmitted to the destination end through the network includes the following operations.

The file path, the file size, the last modification time, the MD5 check value, and the encrypted string are written, in a JSON format, into the information file fileName.xml corresponding to the encrypted file.

The encrypted file is transmitted to the destination end first.

Then, the information file fileName.xml is transmitted to the destination end.

The above technical solution has the following operation principle and beneficial effects.

An information file including the file path, the file size, the last modification time, the MD5 check value, and the encrypted string is generated and transmitted to the destination end, so that the destination end may check the decrypted file after the decryption.

In some embodiments, the operation that the destination end executes the decryption operation based on the encrypted string and the encrypted file to acquire the decrypted file, and performs the integrity check on the decrypted file based on the file information includes the following operations.

The encrypted string is decrypted at the destination end by using the encryption machine.

The corresponding encrypted file is decrypted and decompressed by using the key string and by using a Spark technology.

The integrity check is performed on the decrypted file based on the file information in the information file.

The operation that the encrypted string is decrypted at the destination end by using the encryption machine includes the following operations.

The information file fileName.xml is read to acquire the encrypted string.

The encrypted string is decrypted by using the encryption machine to restore the key string.

The operation that the corresponding encrypted file is decrypted and decompressed by using the key string and by using the Spark technology includes the following operations.

The encrypted file is decrypted by using an SM4 domestic encryption algorithm to obtain a decrypted temporary file tmpFile.zip.

The decrypted temporary file tmpFile.zip is decompressed by using the Spark technology to restore the decrypted file targetSourceFile.

The decrypted temporary file tmpFile.zip is deleted.

The operation that the integrity check is performed on the decrypted file based on the file information in the information file includes the following operations.

The information file fileName.xml is read to acquire a file size, a last modification time, and an MD5 check value.

A file size and an MD5 check value of the decrypted file targetSourceFile at the destination end are acquired.

The integrity check is performed based on the file size and the MD5 check value in the information file and the file size and the MD5 check value of the decrypted file.

The above technical solution has the following operation principle and beneficial effects.

The destination end acquires, through an inverse operation of encryption (i.e., decryption), the set of files transmitted at the data source end. After acquiring the set of files, the files need to be checked according to the information file generated by a data source, so as to ensure the security of data transmission. SM4 is a standard packet data algorithm in a wireless local area network, and is a symmetric encryption for which both a key length and a packet length are 128 bits.

The embodiments of the present disclosure also provide a file encryption and transmission apparatus, including a file acquisition module, a key generation module, a compression and encryption module, a key encryption module, a file transmission module, and a file check module.

The file acquisition module is configured to acquire a set of files to be transmitted.

The key generation module is configured to generate, for file information of each file in the set of files to be transmitted, a key string by using a first preset algorithm.

The compression and encryption module is configured to compress and encrypt the set of files to be transmitted by using the key string to obtain an encrypted file.

The key encryption module is configured to encrypt the key string by using a prefabricated encryption machine to generate an encrypted string.

The file transmission module is configured to transmit the encrypted file, the encrypted string and an information file to the destination end through the network.

The file check module is configured for the destination end to execute the decryption operation based on the encrypted string and the encrypted file to acquire the decrypted file, and to perform integrity check on the decrypted file based on the file information.

The above technical solution has the following operation principle and beneficial effects.

Figure 2:
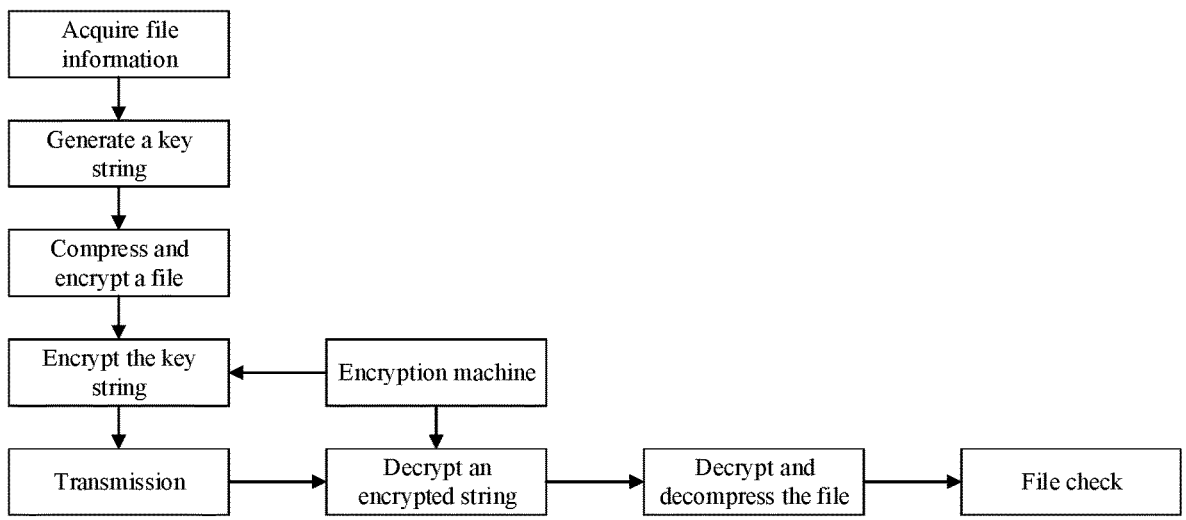
FIG. 2 is a schematic diagram of an application of an encryption machine in the embodiments of the present disclosure.

The file encryption and transmission apparatus of the present disclosure is mainly applied to file transmission between a data source end and a destination end, and mainly includes the following operations: a set of files to be transmitted is acquired; a key string is generated; a file is compressed and encrypted by using the key string and by using a big data technology; the key string is encrypted by using an encryption machine to generate an encrypted string; the file, file information, and the encrypted string are transmitted to the destination end through a network; the encrypted string is decrypted at the destination end to restore the key string; the file is decrypted and decompressed by using the key string and by using the big data technology; and file check is performed based on check information. The file is compressed and encrypted by using the key string and by using the big data technology, which may make full use of cluster hardware resources, and greatly improve the compression and encryption efficiency and the transmission efficiency. The compressed and encrypted file improves the security of network transmission, and greatly reduces the size of the file after being compressed. The network transmission rate may be improved. In order to ensure the integrity of the file, after the file is transmitted to the destination and is decompressed, integrity check needs to be performed on the file to ensure an information transmission function of the file. Furthermore, for the file information of each file in the set of files to be transmitted, the key string is generated by using a first preset algorithm. For example, the file information (e.g., a type, a type proportion, a file size, and the like) of all files in the set of files is traversed, and a preset correspondence table is inquired to determine a first key string, so that the file information of the set of files may be directly inferred according to the first key string at the destination end, and an information file does not need to be generated and transmitted, which further improves the security of file transmission. FIG. 2 is a schematic diagram of an application of an encryption machine in the embodiments of the present disclosure.

In some embodiments, the file information includes one or a combination of: a file path, a file size, the last modification time, and an MD5 check value.

In some embodiments, the file check module is configured to perform the following operations.

Each file in the set of files to be transmitted is compressed, and a compressed temporary file tmpFile.zip is output.

The compressed temporary file is encrypted by using the key string and by using a Spark technology to generate the encrypted file encryptFile.zip.

The compressed temporary file tmpFile.zip is deleted.

The above technical solution has the following operation principle and beneficial effects.

At the data source end, the set of files to be transmitted needs to be encrypted first. Compressing before encrypting is used in the embodiments of the present disclosure, and specific operations for compressing and encrypting the files to be transmitted by using the key string to obtain the encrypted file are as follows: compressing the set of files to be transmitted, and outputting the compressed temporary file tmpFile.zip; encrypting the compressed temporary file by using the key string and by using the Spark technology to generate the encrypted file encryptFile.zip; and finally, deleting the compressed temporary file tmpFile.zip in order to release memory space used for compressing and encrypting. Different compressed files are generated in different compression modes, and may only be restored into original files by corresponding compression programs, so the security of the files may be further improved by the solution of first compressing the file and then encrypting the file using the key string.

In some embodiments, the file check module is configured to perform the following operations.

The file path, the file size, the last modification time, the MD5 check value, and the encrypted string are written, in a JSON format, into the information file fileName.xml corresponding to the encrypted file.

The encrypted file is transmitted to the destination end first.

Then the information file fileName.xml is transmitted to the destination end.

The above technical solution has the following operation principle and beneficial effects.

An information file including the file path, the size, the last modification time, the MD5 check value, and the encrypted string is generated and transmitted to the destination end, so that the destination end may check the decrypted file after the decryption.

In some embodiments, the file check module is configured to perform the following operations.

The encrypted string is decrypted at the destination end by using the encryption machine.

The corresponding encrypted file is decrypted and decompressed by using a key string and by using a Spark technology.

The operation that the integrity check is performed on the decrypted file based on the file information in the information file, and the encrypted string is decrypted by using the encryption machine at the destination end includes the following operations.

The information file fileName.xml is read to acquire the encrypted string.

The encrypted string is decrypted by using the encryption machine to restore the key string.

The operation that the corresponding encrypted file is decrypted and decompressed by using the key string and by using the Spark technology includes the following operations.

The encrypted file is decrypted by using an SM4 domestic encryption algorithm to obtain a decrypted temporary file tmpFile.zip.

The decrypted temporary file tmpFile.zip is decompressed by using the Spark technology to restore the decrypted file targetSourceFile.

The decrypted temporary file tmpFile.zip is deleted.

The operation that the integrity check is performed on the decrypted file based on the file information in the information file includes the following operations.

The information file fileName.xml is read to acquire a file size, a last modification time, and an MD5 check value.

A file size and an MD5 check value of the decrypted file targetSourceFile at the destination end are acquired.

The integrity check is performed based on the file size and the MD5 check value in the information file and the file size and the MD5 check value of the decrypted file.

The above technical solution has the following operation principle and beneficial effects.

The destination end acquires, through an inverse operation of encryption (i.e., decryption), the set of files transmitted at the data source end. After acquiring the set of files, check needs to be performed according to the information file generated by a data source, which may ensure the security of data transmission.

It is apparent that those having ordinary skill in the art may make various modifications and variations to the present disclosure without departing from the principle and the scope of the present disclosure. Thus, if such modifications and variations of the present disclosure fall within the scope of the appended claims and their equivalents, the present disclosure is also intended to cover the modifications and variations.

What is claimed is:

1. A file encryption and transmission method, comprising:
    acquiring a set of files to be transmitted;
    generating, for file information of each file in the set of files to be transmitted, a key string by using a first preset algorithm;
    compressing and encrypting, by using the key string, the set of files to be transmitted to obtain an encrypted file;
    encrypting the key string by using a prefabricated encryption machine to generate an encrypted string; and
    transmitting, through a network, the encrypted file, the encrypted string and an information file to a destination end, and executing, by the destination end, a decryption operation based on the encrypted string and the encrypted file to acquire a decrypted file, and performing, by the destination end, integrity check on the decrypted file based on the file information;
    wherein executing, by the destination end, the decryption operation based on the encrypted string and the encrypted file to acquire the decrypted file, and performing, by the destination end, the integrity check on the decrypted file based on the file information comprises:
    decrypting, by using the encryption machine, the encrypted string at the destination end to obtain the key string;
    decrypting and decompressing the corresponding encrypted file by using the key string and by using a Spark technology; and
    performing the integrity check on the decrypted file based on the file information in the information file.

2. The file encryption and transmission method according to claim 1, wherein the file information comprises one or a combination of: a file path, a file size, a last modification time, and a file Message-Digest Algorithm 5 (MD5) check value.

3. The file encryption and transmission method according to claim 1, wherein compressing and encrypting, by using the key string, the set of files to be transmitted to obtain the encrypted file comprises:
    compressing the set of files to be transmitted, and outputting a compressed temporary file tmpFile.zip;
    encrypting the compressed temporary file by using the key string and by using a Spark technology to generate the encrypted file encryptFile.zip; and
    deleting the compressed temporary file tmpFile.zip.

4. The file encryption and transmission method according to claim 1, wherein transmitting, through the network, the encrypted file, the encrypted string and the information file to the destination end comprises:

writing, in a JSON format, a file path, a file size, a last modification time, an MD5 check value, and the encrypted string into the information file fileName.xml corresponding to the encrypted file;

transmitting the encrypted file to the destination end first; and then transmitting the information file fileName.xml to the destination end.

5. The file encryption and transmission method according to claim 1, wherein decrypting, by using the encryption machine, the encrypted string at the destination end to obtain the key string comprises:

reading the information file fileName.xml to acquire the encrypted string; and decrypting, by using the encryption machine, the encrypted string to restore the key string.

6. The file encryption and transmission method according to claim 1, wherein decrypting and decompressing the corresponding encrypted file by using the key string and by using the Spark technology comprises:

decrypting the encrypted file by using an SM4 domestic encryption algorithm to obtain a decrypted temporary file tmpFile.zip;

decompressing, by using the Spark technology, the decrypted temporary file tmpFile.zip to restore the decrypted file targetSourceFile; and deleting the decrypted temporary file tmpFlile.zip.

7. The file encryption and transmission method according to claim 1, wherein performing the integrity check on the decrypted file based on the file information in the information file comprises:

reading the information file fileName.xml to acquire a file size, a last modification time, and an MD5 check value;

acquiring a file size and an MD5 check value of the decrypted file targetSourceFile at the destination end; and performing the integrity check based on the file size and the MD5 check value in the information file and the file size and the MD5 check value of the decrypted file.

8. The file encryption and transmission method according to claim 1, wherein generating, for the file information of each file in the set of files to be transmitted, the key string by using the first preset algorithm comprises:

traversing the file information of all files in the set of files, and inquiring a preset correspondence table to determine the key string.

9. The file encryption and transmission method according to claim 8, before performing, by the destination end, the integrity check on the decrypted file based on the file information, further comprising:

directly inferring, by the destination end, the file information of the set of files according to the key string based on the preset correspondence table.

10. The file encryption and transmission method according to claim 1, wherein decompressing the corresponding encrypted file comprises:

decompressing the corresponding encrypted file by a compression program that is corresponding to a compression mode in which the set of files to be transmitted is compressed.

11. A file encryption and transmission apparatus, comprising a processor configured to execute a file encryption and transmission program to:

acquire a set of files to be transmitted;

generate, for file information of each file in the set of files to be transmitted, a key string by using a first preset algorithm;

compress and encrypt, by using the key string, the set of files to be transmitted to obtain an encrypted file;

encrypt the key string by using a prefabricated encryption machine to generate an encrypted string;

transmit, through a network, the encrypted file, the encrypted string and an information file to a destination end; and execute, by the destination end, a decryption operation based on the encrypted string and the encrypted file to acquire a decrypted file, and perform, by the destination end, integrity check on the decrypted file based on the file information;

wherein the processor is configured to execute the file encryption a transmission program to execute, by the destination end, a decryption operation based on the encrypted string and the encrypted file to acquire a decrypted file, and perform, by the destination end, integrity check on the decrypted file based on the file information by following operations;

decrypting, by using the encryption machine, the encrypted string at the destination end to obtain the key string;

decrypting and decompressing the corresponding encrypted file by using the key string and by using a Spark technology; and performing the integrity check on the decrypted file based on the file information in the information file.

12. The file encryption and transmission apparatus according to claim 11, wherein the file information comprises one or a combination of: a file path, a file size, a last modification time, and a file Message-Digest Algorithm 5 (MD5) check value.

13. The file encryption and transmission apparatus according to claim 11, wherein the processor, when being configured to execute the file encryption and transmission program to compress and encrypt, by using the key string, the set of files to be transmitted to obtain the encrypted file, is configured to:

compress the set of files to be transmitted, and output a compressed temporary file tmpFile.zip;

encrypt the compressed temporary file by using the key string and by using a Spark technology to generate the encrypted file encryptFile.zip; and delete the compressed temporary file tmpFile.zip.

14. The file encryption and transmission apparatus according to claim 11, wherein the processor, when being configured to execute the file encryption and transmission program to transmit, through the network, the encrypted file, the encrypted string and the information file to the destination end, is configured to:

write, in a JSON format, a file path, a file size, a last modification time, an MD5 check value, and the encrypted string into the information file fileName.xml corresponding to the encrypted file;

transmit the encrypted file to the destination end first; and then transmit the information file fileName.xml to the destination end.

15. The file encryption and transmission apparatus according to claim 11, wherein the processor, when being configured to execute the file encryption and transmission program to decrypt, by using the encryption machine, the encrypted string at the destination end to obtain the key string, is configured to:

read the information file fileName.xml to acquire the encrypted string; and decrypt, by using the encryption machine, the encrypted string to restore the key string.

16. The file encryption and transmission apparatus according to claim 11, wherein the processor, when being configured to execute the file encryption and transmission program to decrypt and decompress the corresponding encrypted file by using the key string and by using the Spark technology, is configured to:

decrypt the encrypted file by using an SM4 domestic encryption algorithm to obtain a decrypted temporary file tmpFile.zip;

decompress, by using the Spark technology, the decrypted temporary file tmpFile.zip to restore the decrypted file targetSourceFile; and delete the decrypted temporary file tmpFlile.zip.

17. The file encryption and transmission apparatus according to claim 11, wherein the processor, when being configured to execute the file encryption and transmission program to perform the integrity check on the decrypted file based on the file information in the information file, is configured to:

read the information file fileName.xml to acquire a file size, a last modification time, and an MD5 check value;

acquire a file size and an MD5 check value of the decrypted file targetSourceFile at the destination end; and perform the integrity check based on the file size and the MD5 check value in the information file and the file size and the MD5 check value of the decrypted file.

18. A non-transitory computer-readable storage medium, storing a file encryption and transmission program, wherein the file encryption and transmission program, when being executed by a processor, causes the processor to implement following operations:

acquiring a set of files to be transmitted;

generating, for file information of each file in the set of files to be transmitted, a key string by using a first preset algorithm;

compressing and encrypting, by using the key string, the set of files to be transmitted to obtain an encrypted file;

encrypting the key string by using a prefabricated encryption machine to generate an encrypted string; and transmitting, through a network, the encrypted file, the encrypted string and an information file to a destination end, and executing, by the destination end, a decryption operation based on the encrypted string and the encrypted file to acquire a decrypted file, and performing, by the destination end, integrity check on the decrypted file based on the file information;

wherein executing, by the destination end, the decryption operation based on the encrypted string and the encrypted file to acquire the decrypted file, and performing, by the destination end, the integrity check on the decrypted file based on the file information comprises:

decrypting by using the encryption machine, the encrypted string at the destination end to obtain the key string;

decrypting and decompressing the corresponding encrypted file by using the key string and by using a Spark technology; and performing the integrity check on the decrypted file based on the file information in the information file.

\* \* \* \* \*